(12) United States Patent
Ream

(10) Patent No.: US 8,649,413 B2
(45) Date of Patent: Feb. 11, 2014

(54) HIGH-POWER LASER FOCUSING APPARATUS WITH PRESSURIZED HOUSING AND AERODYNAMIC WINDOW

(76) Inventor: Stanley L. Ream, Columbus, OH (US)

(*) Notice: Subject to any disclaimer, the term of this patent is extended or adjusted under 35 U.S.C. 154(b) by 0 days.

(21) Appl. No.: 13/553,039

(22) Filed: Jul. 19, 2012

(65) Prior Publication Data

US 2013/0100979 A1 Apr. 25, 2013

Related U.S. Application Data

(60) Provisional application No. 61/509,322, filed on Jul. 19, 2011.

(51) Int. Cl.
*H01S 3/22* (2006.01)

(52) U.S. Cl.
USPC .............................................. 372/55; 372/59

(58) Field of Classification Search
USPC ..................................................... 372/55–60
See application file for complete search history.

*Primary Examiner* — Armando Rodriguez
(74) *Attorney, Agent, or Firm* — McNees Wallace & Nurick

(57) ABSTRACT

A high-powered laser beam focusing apparatus for use in laser welding applications that includes a laser having a beam delivery fiber for generating a laser beam and a housing adapted to receive the beam delivery fiber. The housing further includes a first internal chamber adapted to receive a flow of pressurized gas; a second internal chamber; and an aerodynamic window positioned between the first chamber and the second chamber.

9 Claims, 1 Drawing Sheet

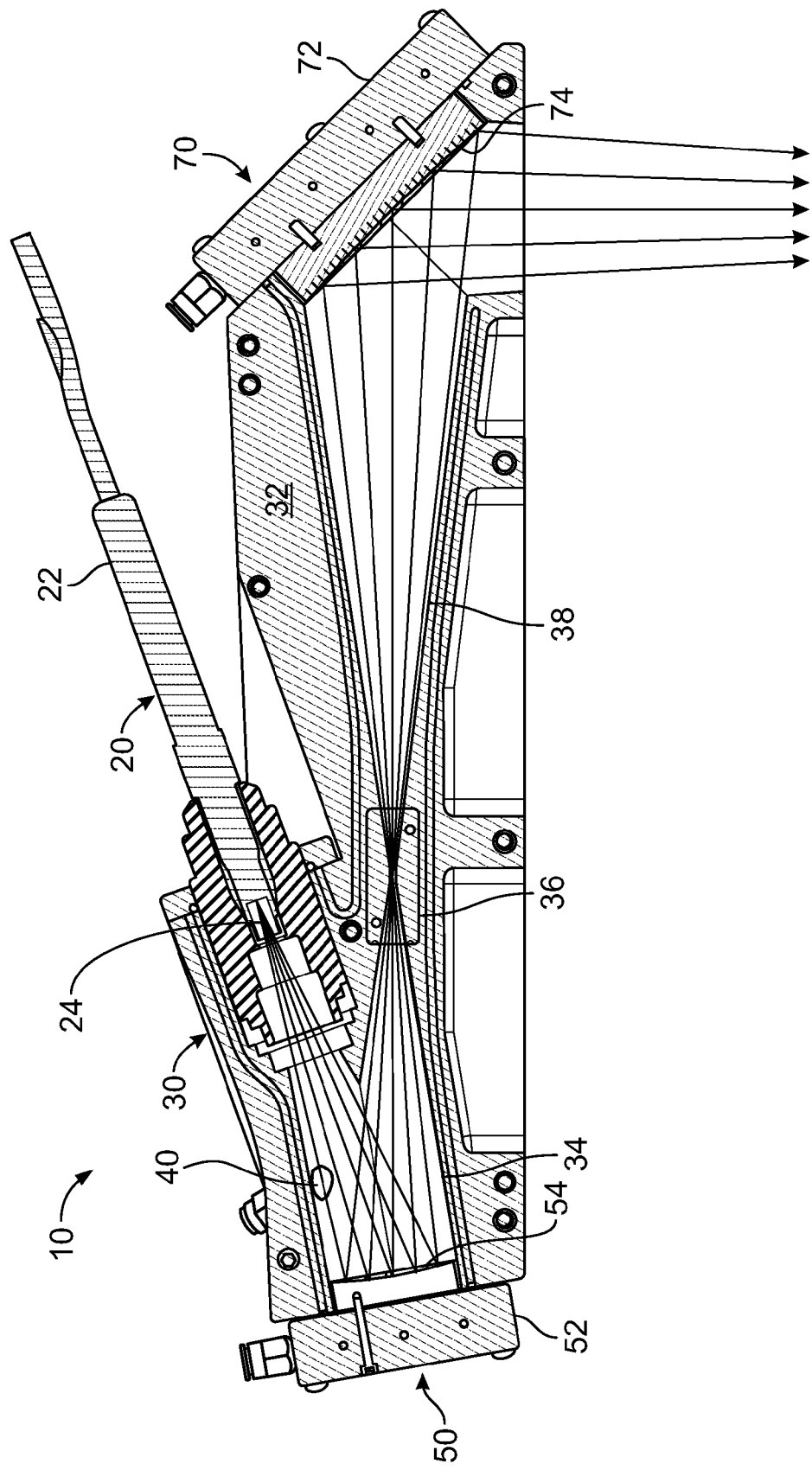

HIGH-POWER LASER FOCUSING APPARATUS WITH PRESSURIZED HOUSING AND AERODYNAMIC WINDOW

CROSS-REFERENCE TO RELATED APPLICATIONS

This patent application claims the benefit of U.S. Provisional Patent Application Ser. No. 61/509,322 filed on Jul. 19, 2011, and entitled "High-Power Laser Focusing Apparatus with Pressurized Housing and Aerodynamic Window," the disclosure of which is hereby incorporated by reference herein in its entirety and made part of the present U.S. utility patent application for all purposes.

BACKGROUND OF THE INVENTION

The present invention relates generally to laser beam focusing devices used in laser welding systems, and more specifically to a high-power laser welding optical apparatus that includes a pressurized chamber and an aerodynamic window for preventing contaminants from damaging the internal components of the apparatus.

The advent of higher power, near-infrared (e.g., 1.07 um) lasers has rendered currently available optical systems used to focus laser light for welding purposes inadequate. Commercially available optical systems that are used with fiber-delivered laser beams typically demonstrate thermally-induced focal shift and focus quality degradation because the transmitting lenses and protective windows incorporated therein are subject to thermal distortion. This problem is exacerbated when any contamination (e.g., dust, soot, etc.) generated at the work surface contacts the delicate surfaces of the lenses. Fully reflective focusing optics provide a possible solution to this problem, but such optics usually require a transmitting "window" to protect the operative end of the laser delivery fiber. Such transmitting windows are known to be problematic because contaminants that accumulate on the window can impair the function of the laser beam focusing device and affect the quality of the final weld. Thus, there is an ongoing need for a laser beam focusing apparatus that does not suffer from these limitations.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a first high-powered laser beam focusing apparatus is provided. This apparatus includes a laser having a beam delivery fiber for transmitting a laser beam and a housing adapted to receive the beam delivery fiber. The housing further includes a first chamber adapted to receive a flow of pressurized gas; a second chamber in close proximity to the first chamber; and an aerodynamic window positioned between the first chamber and the second chamber.

In accordance with another aspect of the present invention, a second high-powered laser beam focusing apparatus is provided. This apparatus includes a laser having a beam delivery fiber for transmitting a laser beam; a housing adapted to receive the beam delivery fiber; a focusing optic connected to the housing and facing into the first chamber, wherein the focusing optic is operative to receive, focus, and redirect the laser beam into the aerodynamic window; and a reimaging optic connected to the housing and facing into the second chamber, wherein the reimaging optic is operative to receive the laser beam exiting the aerodynamic window and reimage and redirect the laser beam onto a work surface. The housing further includes a first chamber adapted to receive a flow of pressurized gas; a second chamber in close proximity to the first chamber; and an aerodynamic window positioned between the first chamber and the second chamber.

In yet another aspect of this invention, a third high-powered laser beam focusing apparatus is provided. This apparatus includes a laser having a beam delivery fiber for transmitting a laser beam; a housing adapted to receive the beam delivery fiber; a focusing optic connected to the housing and facing into the first chamber, wherein the focusing optic is operative to receive, focus, and redirect the laser beam into the aerodynamic window; a reimaging optic connected to the housing and facing into the second chamber, wherein the reimaging optic is operative to receive the laser beam exiting the aerodynamic window and reimage and redirect the laser beam onto a work surface; and a source of pressurized gas connected to the first chamber, wherein the flow of gas into the first chamber and the geometric characteristics of the aerodynamic window are operative to prevent debris generated at the work surface from passing through the aerodynamic window and entering the first chamber. The housing further includes a first chamber adapted to receive a flow of pressurized gas; a second chamber in close proximity to the first chamber; and an aerodynamic window positioned between the first chamber and the second chamber.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawing, which is incorporated into and forms a part of the specification, schematically illustrates one exemplary embodiment of the invention and, together with the general description given above and detailed description given below, serve to explain the principles of the invention, and wherein:

FIG. 1 is a cross-sectional view of an exemplary embodiment of the laser beam focusing apparatus of the present invention showing the internal components thereof.

DESCRIPTION OF THE INVENTION

Exemplary embodiments of the present invention are now described with reference to the Figures. Although the following detailed description contains many specifics for purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

An exemplary embodiment of the present invention utilizes a pressurized chamber located upstream from an aerodynamic window to create a barrier against the entry of contamination into the region containing the delicate laser delivery fiber. Thus, this invention provides a totally reflective beam path from the laser beam delivery fiber to the work surface being processed while eliminating the need to incorporate problematic transmitting windows to protect the fiber end. Additionally, the present invention provides a longer stand-off distance from the optical device to the work surface, thus further preventing damage to the optics in the present invention.

With reference to FIG. 1, an exemplary embodiment of this invention includes laser beam focusing assembly 10, housing 30, focusing mirror assembly 50, and reimaging mirror assembly 70. Laser beam focusing assembly 10, which is typically used in conjunction with a high-power YAG laser, fiber laser, or disk laser, includes laser delivery fiber connector 22 and fiber output surface 24, which is a very fragile component. Housing 30 (see FIG. 2) is typically machined from aluminum or a comparable material and includes solid portion 32, first chamber 34, aerodynamic window 36, and second chamber 38. Gas port 40 is formed in first chamber 34 and provides an entry point for the inflow of pressurized gas. Focusing assembly 50 includes water-cooled mount 52 and focusing optic 54, which is an asymmetric asphere mirror (i.e., no center of rotation). Reimaging assembly 70 includes water cooled mount 72 and reimaging optic 74, which is also an asymmetric asphere mirror. In this embodiment, reimaging mirror 74 has an area that is about four times greater than the area of focusing mirror 54, thus providing greater resistance to contamination than the smaller of the two mirrors.

With reference to FIGS. 1 and 3-4, when laser beam focusing apparatus 10 is in use for laser welding applications, a laser beam is directed by laser beam delivery fiber 20 onto focusing mirror 54, which redirects and focuses the laser beam toward a first focusing region located within or near aerodynamic window 36. After passing through aerodynamic window 36, the laser beam diverges and is directed onto reimaging mirror 70, which then redirects the reimaged laser beam onto a work surface. Pressurized gas is directed into first chamber 34 through gas port 40 for the purpose of creating a high velocity gas flow between first chamber 34 and second chamber 38. The combination of the flow of gas through aerodynamic window 36 and the small aperture created by aerodynamic window 36 prevents contaminants generated at the work surface from entering first chamber 34 and damaging the focusing optic and/or the fiber outlet surface of the beam delivery fiber. Accordingly, this invention makes possible the use of high power (e.g., 10 kW) fiber delivered laser energy for long duration welding without suffering the instabilities and inadequacies associated with currently available optics.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed:

1. A high-powered laser beam focusing apparatus, comprising;
   (a) a laser having a beam delivery fiber for generating a laser beam;
   (b) a housing adapted to receive the beam delivery fiber, wherein the housing further includes:
      (i) a first chamber, wherein the chamber is adapted to receive a flow of pressurized gas;
      (ii) a second chamber; and
      (iii) an aerodynamic window positioned between the first chamber and the second chamber; and
   (c) a focusing optic connected to the housing and facing into the first chamber, wherein the focusing optic is operative to receive, focus, and redirect the laser beam into the aerodynamic window; and
   (d) a reimaging optic connected to the housing and facing into the second chamber, wherein the reimaging optic is operative to receive the laser beam exiting the aerodynamic window and reimage and redirect the laser beam onto a work surface.

2. The apparatus of claim 1, further comprising a source of pressurized gas connected to the first chamber, wherein the flow of gas into the first chamber and the geometric characteristics of the aerodynamic window are operative to prevent debris generated at the work surface from passing through the aerodynamic window and entering the first chamber.

3. The apparatus of claim 1, wherein the laser is a high-power YAG laser, fiber laser, or disk laser.

4. The apparatus of claim 1, wherein the focusing optic is an asymmetric asphere mirror.

5. The apparatus of claim 1, wherein the reimaging optic is an asymmetric asphere mirror.

6. A high-powered laser beam focusing apparatus, comprising;
   (a) a laser having a beam delivery fiber for generating a laser beam;
   (b) a housing adapted to receive the beam delivery fiber, wherein the housing further includes:
      (i) a first chamber, wherein the first chamber is adapted to receive a flow of pressurized gas;
      (ii) a second chamber; and
      (iii) an aerodynamic window positioned between the first chamber and the second chamber; and
   (c) a focusing optic connected to the housing and facing into the first chamber, wherein the focusing optic is operative to receive, focus, and redirect the laser beam into the aerodynamic window;
   (d) a reimaging optic connected to the housing and facing into the second chamber, wherein the reimaging optic is operative to receive the laser beam exiting the aerodynamic window and reimage and redirect the laser beam onto a work surface; and
   (e) a source of pressurized gas connected to the first chamber, wherein the flow of gas into the first chamber and the geometric characteristics of the aerodynamic window are operative to prevent debris generated at the work surface from passing through the aerodynamic window and entering the first chamber.

7. The apparatus of claim 6, wherein the laser is a high-power YAG laser, fiber laser, or disk laser.

8. The apparatus of claim 6, wherein the focusing optic is an asymmetric asphere mirror.

9. The apparatus of claim 6, wherein the reimaging optic is an asymmetric asphere mirror.

* * * * *